(12) United States Patent
Leff et al.

(10) Patent No.: US 9,146,977 B2
(45) Date of Patent: *Sep. 29, 2015

(54) DETECTING DATA OMISSIONS FOR AN INTERMITTENTLY-CONNECTED APPLICATION

(71) Applicant: International Business Machines Corporation, Armonk, NY (US)

(72) Inventors: Avraham Leff, Spring Valley, NY (US); James T. Rayfield, Ridgefield, CT (US)

(73) Assignee: International Business Machines Corporation, Armonk, NY (US)

(*) Notice: Subject to any disclaimer, the term of this patent is extended or adjusted under 35 U.S.C. 154(b) by 29 days.

This patent is subject to a terminal disclaimer.

(21) Appl. No.: 14/036,201

(22) Filed: Sep. 25, 2013

(65) Prior Publication Data

US 2014/0195479 A1    Jul. 10, 2014

Related U.S. Application Data

(63) Continuation of application No. 13/737,732, filed on Jan. 9, 2013.

(51) Int. Cl.
*G06F 17/00* (2006.01)
*G06F 17/30* (2006.01)

(52) U.S. Cl.
CPC .... *G06F 17/30575* (2013.01); *G06F 17/30112* (2013.01)

(58) Field of Classification Search
None
See application file for complete search history.

(56) References Cited

U.S. PATENT DOCUMENTS

| 6,694,335 | B1* | 2/2004 | Hopmann et al. ............ 707/624 |
| 7,464,097 | B2 | 12/2008 | Goetz et al. |
| 7,580,970 | B2 | 8/2009 | Bank et al. |
| 2004/0139235 | A1* | 7/2004 | Rashid et al. ............... 709/248 |
| 2007/0198528 | A1 | 8/2007 | Harris |
| 2011/0191314 | A1* | 8/2011 | Howes et al. ............... 707/706 |

* cited by examiner

*Primary Examiner* — Robert Beausoliel, Jr.
*Assistant Examiner* — Hau H Hoang
(74) *Attorney, Agent, or Firm* — Ido Tuchman; Anne V. Dougherty

(57) ABSTRACT

A system, method and computer program product for detecting data omissions between intermittently-connected devices. An example system includes a client device configured to execute client queries on a client data set, and generate client result sets. The client queries and client result sets are stored on a query queue as queued queries and queued result sets. The system includes a server device with a data omission detector and server database. The data omission detector receives the queued queries and queued result sets after detecting a network connection, executes server queries on the server database and generates server result sets. The server queries are based on the queued queries. The data omission detector compares the server result sets with queued result sets to determine if there are data omissions. Data omissions include data absent in the queued result set that is present in a server result set.

14 Claims, 4 Drawing Sheets

DETECTING DATA OMISSIONS FOR AN INTERMITTENTLY-CONNECTED APPLICATION

CROSS-REFERENCE TO RELATED APPLICATIONS

This application claims priority under 35 U.S.C. §120 to U.S. patent application Ser. No. 13/737,732 filed Jan. 9, 2013, the entire text of which is specifically incorporated by reference herein.

BACKGROUND

The present invention relates to intermittently-connected devices. More particularly, the present invention relates to detecting data omissions in intermittently-connected devices.

Mobile applications often execute while disconnected from the server. The mobile device is therefore typically stocked in advance of disconnection with the data needed for correct application execution. This is termed the "replication" phase of the application lifecycle.

In general, developers of mobile applications must determine the data set required by a given application. If this determination is done incorrectly, the application will query its database as part of its business logic and receive incorrect or incomplete answers. Copying the entire database from the server to the client is often unrealistic because the amount of storage on many devices often constrains the amount of storage that is available to a given application.

Determining the data set required by a given application in advance of the application's execution is a difficult problem. For example, it is typically impossible to predict the input that will be supplied to the application, and these inputs often determine what data are required by the application. Furthermore, the data set depends on the application's business logic which may be difficult to fully understand, if only because some of the logic (e.g., enterprise workflow) may not be formally represented in the application itself. It is therefore assumed that, in practice, the mobile application may not have the correct data set stored on the device. Current approaches use ad-hoc logic to specify replication query, and fail to detect problems that relate to application-specific and workflow semantics

SUMMARY

An aspect of the present invention is a method for detecting data omissions between intermittently-connected devices. The method includes executing a client query on a client data set stored on a client device. The method further includes generating a client result set based on the client query. The method includes storing the client query and client result set on the client device. The client query and client result set are stored in a client queue as a queued query and queued result. The method further includes detecting a network connection between the client device and a server device. After detecting the network connection, the method includes reading the query queue and executing a server query on a server database stored on the server device. The server query is based on the queued query. The method further includes generating a server result based on the server query. The method includes comparing the server result and queued result to determine if there is data omission. Data omission includes data absent in the queued result that is present in the server result.

Another aspect of the present invention is a system for detecting data omissions between intermittently-connected devices. The system includes a client device intermittently connected to a server device. The client device includes software configured to execute a client query on a client data set stored on the client device, and generate a client result based on the client query. The software is further configured to store the client query and client result set in a client queue as a queued query and a queued result set. The server device includes a data omission detector. The data omission detector is configured to receive the queued query and queued result set, and execute a server query on a server database stored on the server device. The server query is based on the queued query. The data omission detector is further configured to generate a server result set based on the server query. Furthermore, the data omission detector determines if there is a data omission. The data omission includes data absent in the queued result that is present in the server result.

Yet another example aspect of the invention is a computer program product for detecting data omissions between intermittently-connected devices. The computer program product includes computer readable program code configured to: execute a client query on a client data set stored on a client device, generate a client result set based on the client query, store the client query and client result set in a client queue as a queued query and queued result set, detect a network connection between the client device and a server device, read the query queue after detecting the network connection, execute a server query on a server database, generate a server result set based on the server query, and compare the server result set and queued result set to at least determine if there is data absent in the queued result set that is present in the server result set.

DETAILED DESCRIPTION

The present invention is described with reference to embodiments of the invention, but shall not be limited to the referenced embodiments. Throughout the description of the present invention, references are made to FIGS. 1 through 4.

It is initially noted that the environments described below and depicted in the figures are for the purpose of illustrating suggested embodiments of the present invention. Thus, the present invention should not be construed as limited to the environment configurations shown and discussed herein. Therefore, the present invention encompasses alternative orientations and configurations of the suggested embodiments.

Embodiments of the present invention provide possible systems for detecting data omissions between intermittently-connected devices, and possible methods for operating such systems.

Figure 1:
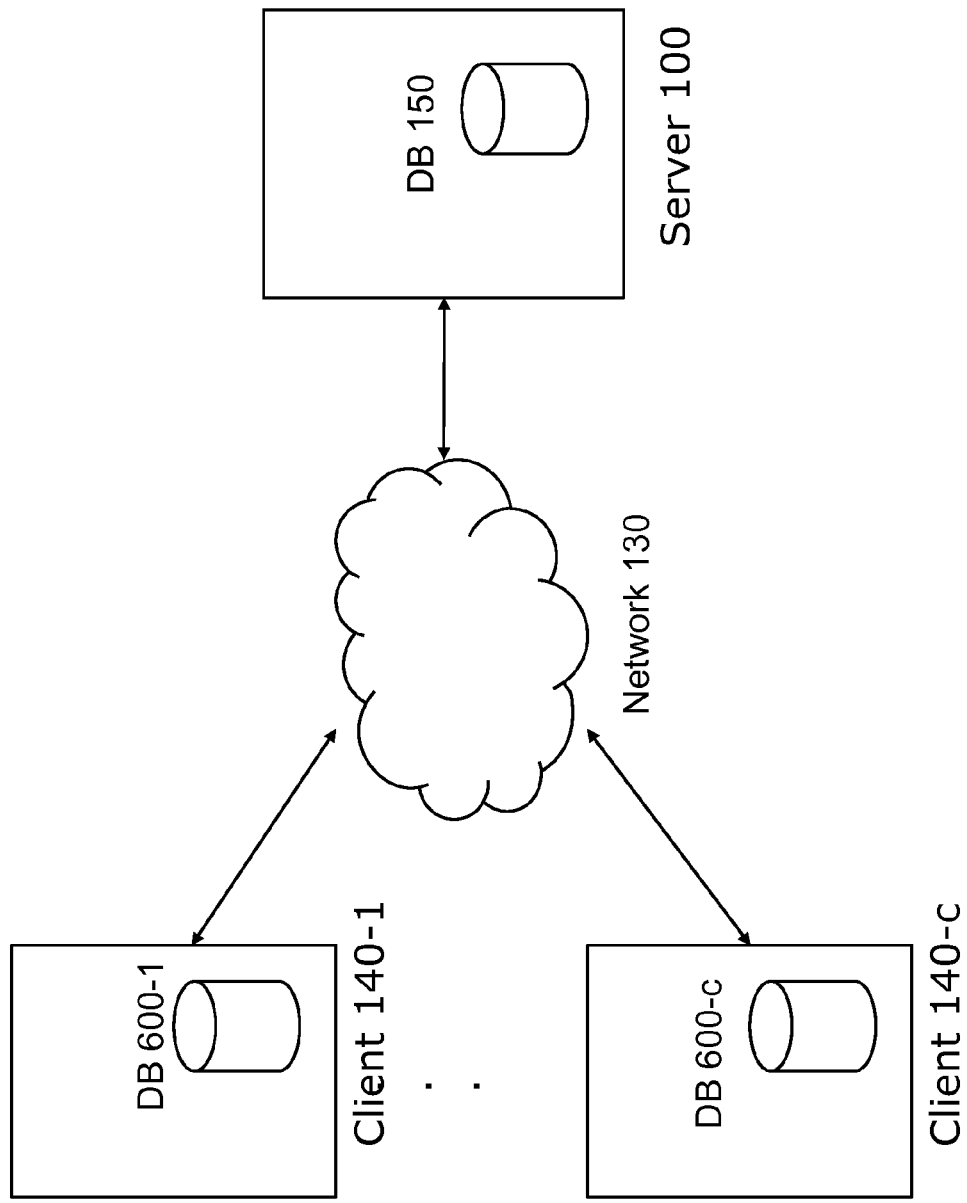
FIG. 1 is a schematic representation of a computing system for use with the detection of data omissions for an intermittently connected application system, in accordance with one embodiment of the present invention.

FIG. 1 is a diagram depicting a distributed computing system environment for use with the system and methods in accordance with one embodiment of the present invention. The computing system can be a distributed computing system operating in one or more domains. One skilled in the art would recognize suitable distributed computing systems. Included in the computing system is a server 100 containing a database 150 and C client devices 140-1, . . . , 140-C. Each of the client devices 140-C are in intermittent communication to the server 100 through one or more networks 130 including side area networks and local area networks.

Figure 2:
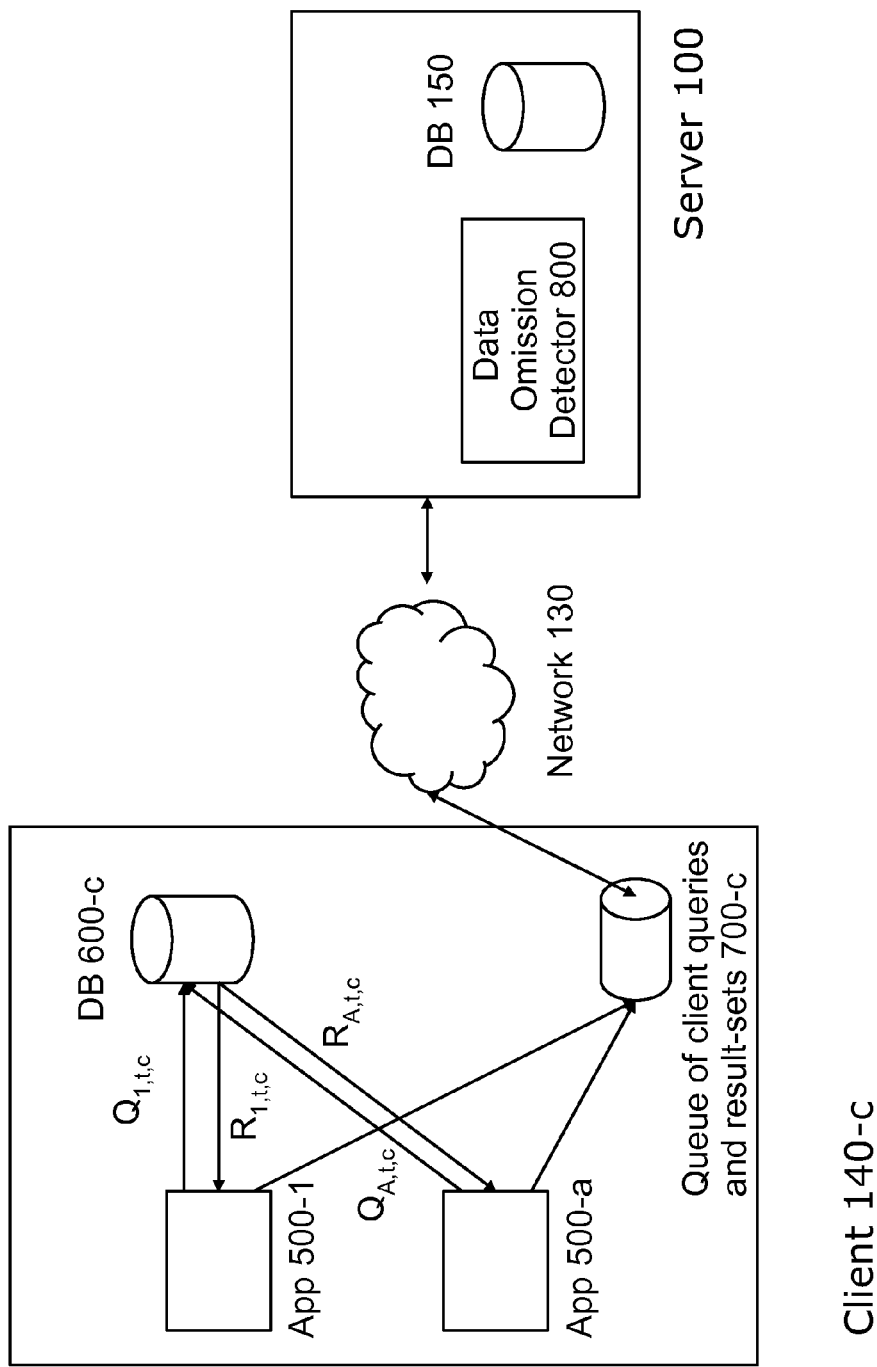
FIG. 2 is a schematic representation of a system for detection of data omissions for an intermittently connected application system, in accordance with one embodiment of the present invention.
Figure 4:
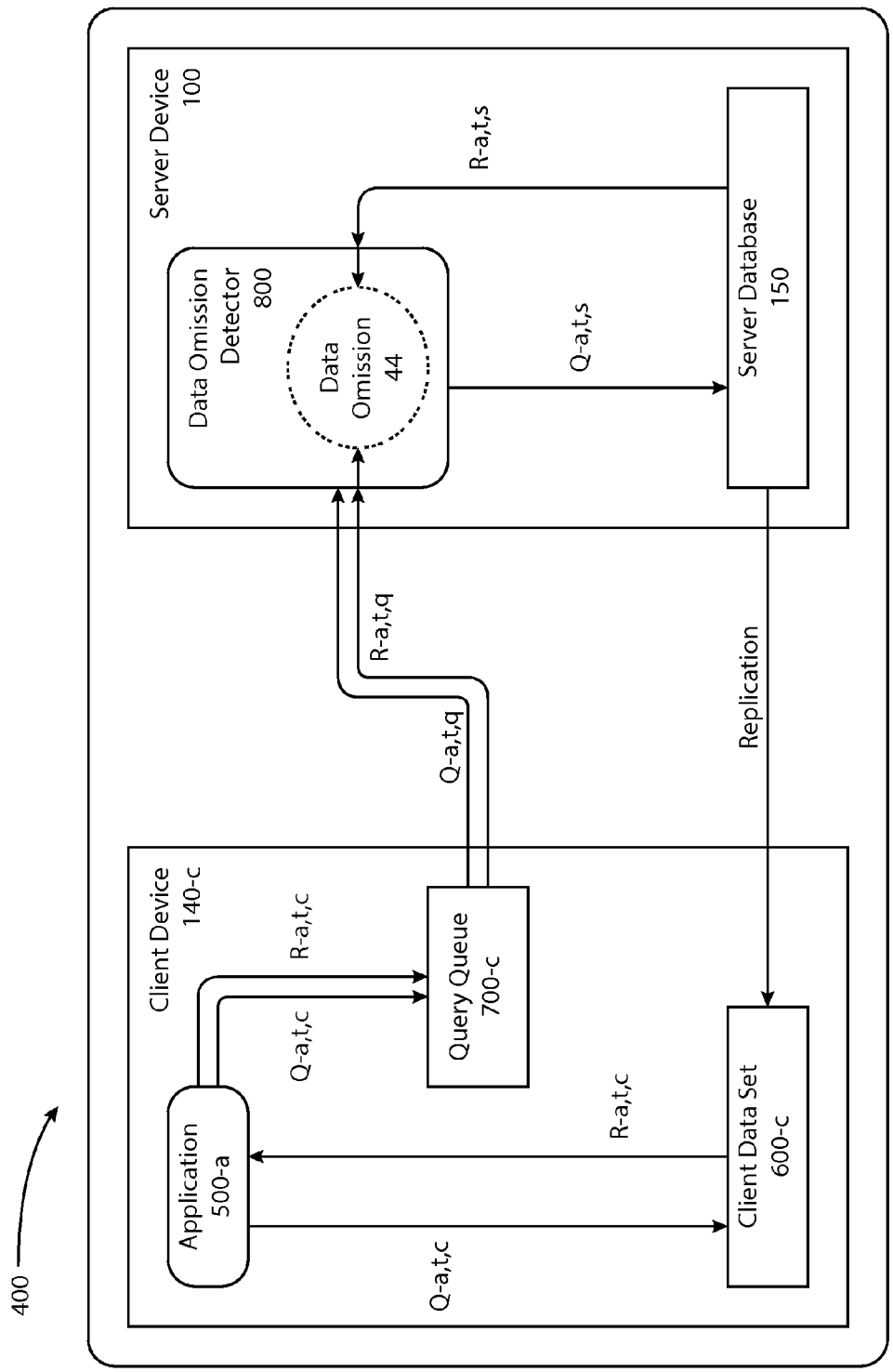
FIG. 4 is a schematic representation of data flow in a computer program product for detection of data omissions in an intermittently connected application system, in accordance with one embodiment of the present invention.

Referring to FIGS. 2 and 4, example systems for the detection and correction of data omissions is illustrated. A set of A applications 500-1, . . . , 500-$a$ execute on each client device 140-C. Each application reads or writes data into a client data set 600-$c$. As application 500-$a$ executes, it issues T client queries where t ranges from 1 to T-a. The execution of a client query Q-a,t,c generates a client result set R-a,t,c. A record of the client query Q-a,t,c and associated client result set R-a,t,c is stored in a query queue 700 for subsequent execution when the client device 140-C is connected to the server 100 through one or more networks 130. The execution of the elements in query queue 700 occurs when the client device 140-C is connected to the server 100 through a process driven by the data omission detector 800.

The data omission detector executes a server query Q-a,t,s based on the client query Q-a,t,c. The server query takes place against the server database 150 and generates a server result set R-a,t,s which is compared against the client result set R-a,t,c. The existence of data in the client result set R-a,t,c that are not in the server result set R-a,t,s is not of interest in this embodiment of the present invention, because application execution may have created data in client data set 600-$c$ that do not exist in server database 150. However, the existence of data in the server result set R-a,t,s that are not in the client result set R-a,t,c is used by this embodiment to correct the omission of data that should be replicated to the client device 140-C. In addition, if the data was created before replication of server data to the client device 140-C, and the data was not deleted during the application's execution, this embodiment detects an error in the replication process that should have replicated the data to the client device 140-C.

Figure 3:
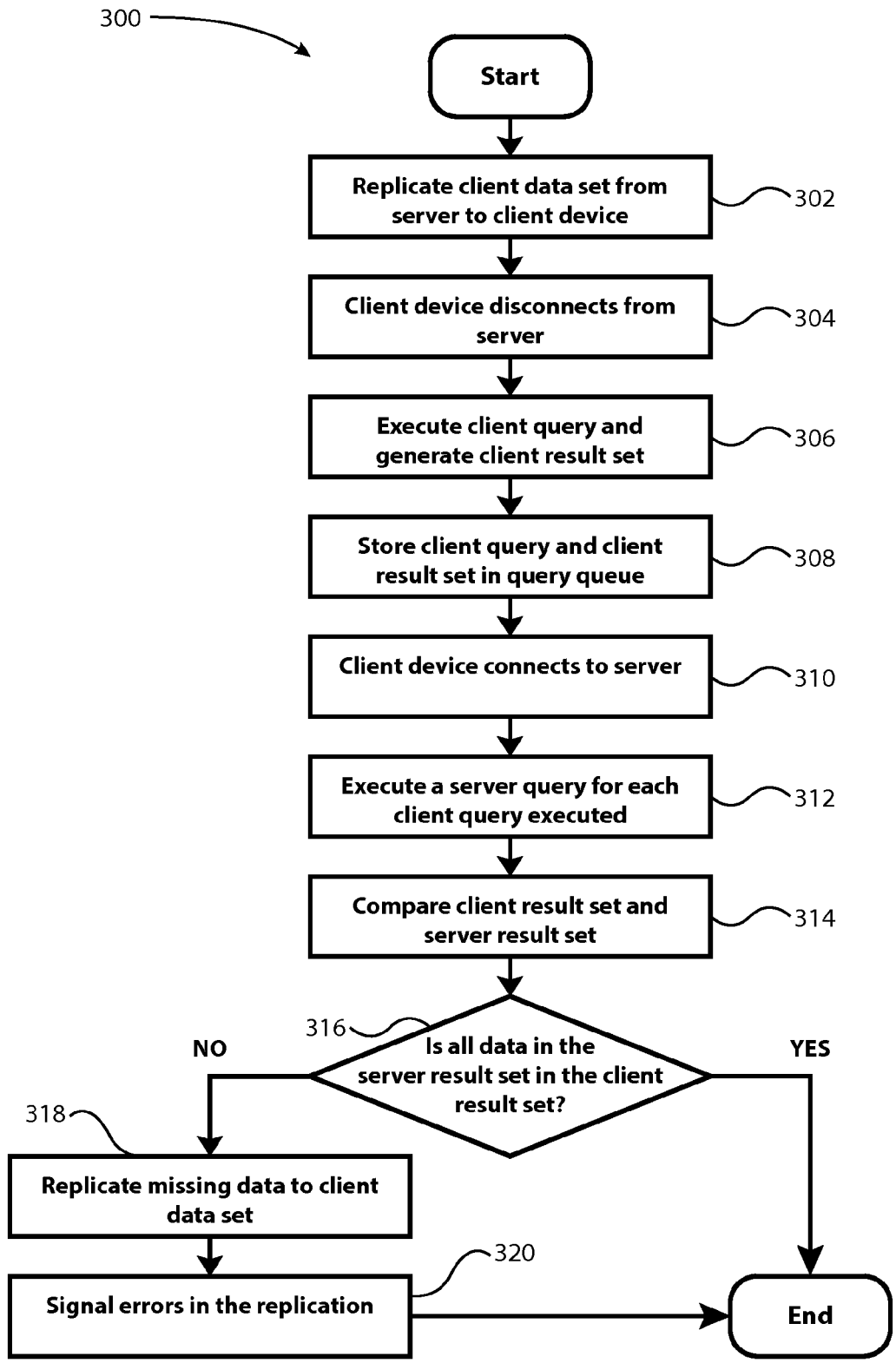
FIG. 3 is a flow chart illustrating a method for detection of data omissions for an intermittently connected application system, in accordance with one embodiment of the present invention.

FIG. 3 is a flow chart 300 depicting a method for detection and correction of data omissions, in accordance with one embodiment of the present invention. The method begins with replicating step 302. During replicating step 302, server 100 replicates data from database 150 into client data set 600-$c$ residing on client device 140-C. After replicating step 302, the method continues to disconnecting step 304. In disconnecting step 304, client device 140-C disconnects from the server 100. After disconnecting step 304, the method continues to executing step 306.

During executing step 306, one or more applications 500-$a$ execute at least one client query Q-a,t,c and generates client result set R-a,t,c. After executing step 306, the method continues to storing step 308. During storing step 308, any client query Q-a,t,c executed and the associated client result set R-a,t,c are stored in a query queue 700-$c$, as a queued query Q-a,t,q and a queued result set R-a,t,q, respectively. After storing step 308, the method continues to connecting step 310. During connecting step 310, the client device 140-C reconnects to the server 100 over network 130. After connecting step 310, the method continues to executing step 312.

During executing step 312, the data omission detector 800 executes a server query Q-a,t,s for each queued query Q-a,t,q in the query queue 700-$c$, generating server result set R-a,t,s. After executing step 312, the method continues to comparing step 314. During comparing step 314, data omission detector 800 compares the queued result set R-a,t,q and the server result set R-a,t,s. After comparing step 314, the method continues to step 316.

During step 316, if all data in the server result set R-a,t,s is also in the queued result set R-a,t,q, then the replication in step 302 had no data omissions, and the method is complete. During step 316, if there is data absent in the queued result set that is present in the server result set, there are data omissions, and the method continues to replicating step 318. During replicating step 318, the missing data is replicated from the server database 150 to the client data set 600-$c$. After replicating step 318, the method continues to signaling step 320. During signaling step 320, if the missing data was created before replication of server data to the client data set, and these records were not deleted during the application's execution, an error in the replication process of step 302 is signaled. After signaling step 320, the method is complete.

FIG. 4 is a schematic diagram of data flow in a system 400 for detecting data omissions in an intermittently connected application system, in accordance with one embodiment of the present invention. FIG. 4 depicts the queued query Q-a,t,q and queued result set R-a,t,q being sent from the query queue 700-$c$ to the data omission detector 800. The data omission detector 800 compares the queued result set R-a,t,q with the server result set R-a,t,s to determine if there is a data omission 44. FIG. 4 further depicts the replication of data from the server database 150 to the client data set 600-$c$.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for detecting data omissions between intermittently-connected devices, the system comprising:
    a client device intermittently connected to a server device, the client device including software configured for:
        (a) executing a client query on a client data set stored on the client device;
        (b) generating a client result set based on the client query; and
        (c) storing the client query and client result set in a client queue as a queued query and a queued result set; and
    wherein the server device includes a data omission detector configured for:
        (d) receiving the queued query and queued result set;
        (e) executing a server query on a server database stored on the server device, the server query based on the queued query;
        (f) generating a server result set based on the server query;
        (g) determining if there is a data omission, the data omission includes data absent in the queued result set that is present in a server result set, the server result set based on the queued query;
        (h) replicating the data absent in the client data set from the server database if data omission is detected; and
        (i) flagging the queued result set and displaying an error message if data omission is detected.

2. The system of claim 1, wherein the client query is executed when the client device is disconnected from the server device.

3. The system of claim 1, wherein the client data set includes data replicated from the server database.

4. The system of claim 3, wherein the server device is further configured to modify a replication algorithm based on the data omission, if data omission is detected.

5. The system of claim 1, wherein the server device is further configured to notify an application developer of the data omission, if data omission is detected.

6. The system of claim 1, wherein the client query is executed by one or more applications on the client device.

7. The system of claim 1, wherein the queued result set is based on the client data set stored on the client device.

8. A computer program product for detecting data omissions between intermittently-connected devices, the computer program product comprising:

at least one non-transitory computer readable storage medium having computer readable program code embodied therewith, the computer readable program code configured to:
(a) execute a client query on a client data set stored on a client device;
(b) generate a client result set based on the client query;
(c) store the client query and client result set in a client queue as a queued query and queued result set, the client queue located on the client device;
(d) detect a network connection between the client device and a server device;
(e) read the query queue after detecting the network connection;
(f) execute a server query on a server database, the server database stored on the server device, the server query based on the queued query;
(g) generate a server result set based on the server query;
(h) compare the server result set and queued result set to at least determine if there is data omission, the data omission including data absent in the queued result set that is present in the server result set;
(i) replicate the data absent in the client data set from the server database, if data omission is detected; and
(j) flag the queued result set and display an error message, if data omission is detected.

9. The computer program product of claim 8, wherein the client query is executed when the client device is disconnected from the server device.

10. The computer program product of claim 8, wherein the client data set includes data replicated from the server database.

11. The computer program product of claim 10, wherein the program code is further configured to modify a replication algorithm based on the data omission, if data omission is detected.

12. The computer program product of claim 8, wherein the program code is further configured to notify an application developer of the data omission, if data omission is detected.

13. The computer program product of claim 8, wherein the client query is executed by one or more applications on the client device.

14. The computer program product of claim 8, wherein the queued result set is based on the client data set stored on the client device.

* * * * *